April 30, 1968 — A. NIELSEN — 3,380,393
VARIABLE VENTURI INJECTOR
Filed March 21, 1966
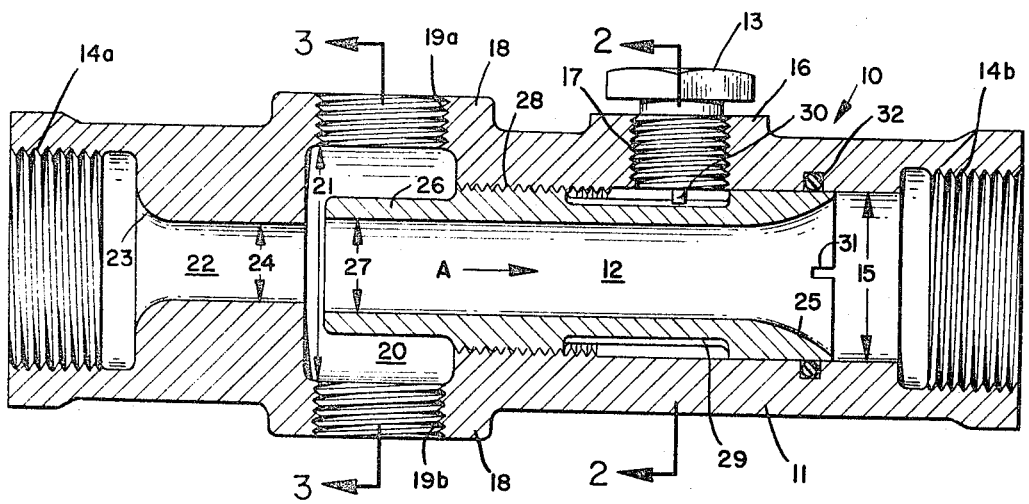
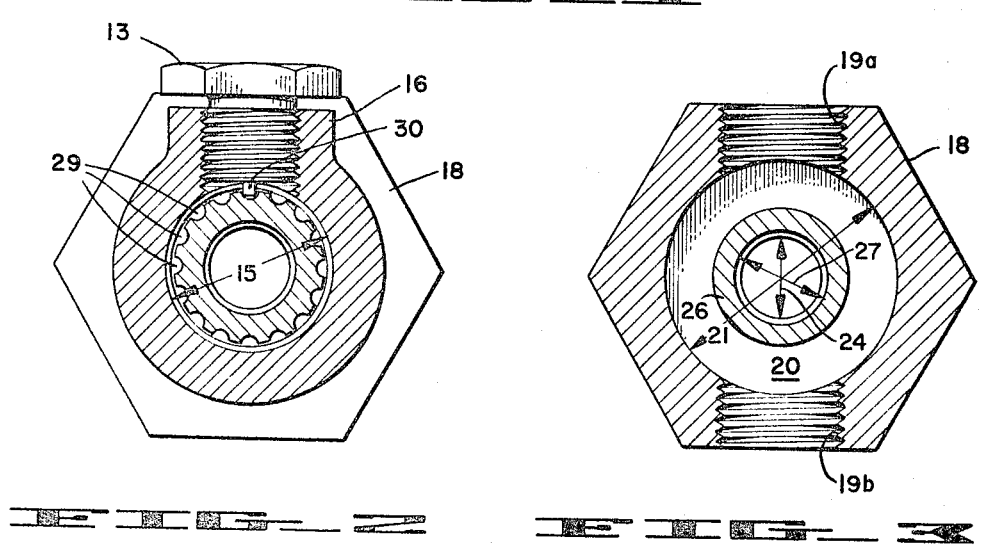
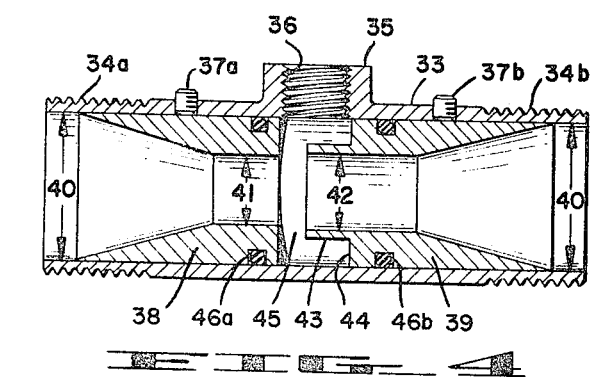
INVENTOR.
ADOLPH NIELSEN
BY
Mellin, Moore + Weissenberger
ATTORNEYS

United States Patent Office 3,380,393
Patented Apr. 30, 1968

3,380,393
VARIABLE VENTURI INJECTOR
Adolph Nielsen, 8006 Iris St., Oakland, Calif. 94605
Filed Mar. 21, 1966, Ser. No. 535,851
6 Claims. (Cl. 103—271)

ABSTRACT OF THE DISCLOSURE

A variable venturi injector having a housing defining an injector aperture thereon, a throat section, and an adjustable venturi section axially movable in the housing, the venturi section having a cylindrical end section which extends toward the throat and defines a mixing chamber with the housing at the injector aperture, the venturi section being axially movable to contact the throat section to no longer define a mixing chamber.

---

This invention relates to a variable venturi injector and includes a venturi section, the upstream end of which is axially adjustable within a mixing chamber to thereby vary the rate of injection into the mixing chamber.

It is often desirable to inject one fluid, usually a liquid, into a line in which another fluid, usually a liquid, is flowing under pressure. It may be desirable, for example, to inject a fluid containing fertilizer dissolved or suspended therein into a pressurized irrigation or watering line. A fluid poison concentrate, a caustic solution, and an acidic solution are additional examples of injections that may be desirable additions to a fluid flowing under pressure.

The present invention provides means for injecting one fluid into another and a means for varying the rate of injection. The injection is accomplished without resort to merely subjecting the additive liquid to a pressure in excess of the line pressure to thereby create a pressure gradient and force the additive into the line. The injection is accomplished by the utilization of a venturi and the invention comprises an improvement over my application Ser. No. 376,768, filed June 22, 1964, now Patent No. 3,282,227, issued Nov. 1, 1966, and entitled "Adjustable Venturi Injector."

The venturi injectors of the prior art have generally been incapable of providing the high injection rate provided by the present invention and, moreover, they have in general been more complicated and expensive. In addition they have been deficient where a series of injections is desired because their "pulling" power has not been sufficient to accommodate a number of injection lines.

Accordingly, it is an object of the present invention to provide a venturi injector, the rate of injection of which can be varied.

It is a further object to provide a variable venturi injector having a high rate of injection capable of accommodating a series of injection lines.

It is a further object to provide a variable injector having a mixing chamber and a venturi section, the upstream end of which is axially adjustable within said mixing chamber to thereby vary the rate of injection.

It is a further object to provide a variable venturi injector having a mixing chamber and a venturi section the upstream end of which is axially adjustable within said mixing chamber, and means for locking said venturi section in place.

A specific embodiment appears in FIGS. 1, 2 and 3 and a variation in the design appears in FIG. 4.

FIG. 1 is a longitudinal sectional view of the invention.

FIG. 2 is a sectional view taken on the line 2—2 of FIG. 1.

FIG. 3 is a sectional view taken on the line 3—3 of FIG. 1.

FIG. 4 is a longitudinal sectional view of a variation in the design of the injector.

With reference to FIG. 1, the variable venturi injector 10 includes a housing section 11 which is roughly cylindrical, an axially adjustable venturi section 12, and a locking plug 13.

Housing section 11 contains threads 14a (upstream) and 14b (downstream) for insertion into a fluid line. Housing section 11 has a nominal inside diameter shown at 15 which corresponds to the inside diameter of the flow line conduit which threadably engages threads 14a and 14b. With boss 16, section 11 defines threadable locking plug aperture 17. An enlarged hexagonal peripheral section 18 defines two diametrically opposed threaded injector apertures 19a and 19b as well as mixing chamber 20. Mixing chamber 20 has an inside diameter 21 greater than nominal diameter 15.

Housing section 11 also defines throat 22 which has a flared entry 23 on its upstream side and converges to throat diameter 24. Throat 22 communicates with mixing chamber 20.

Adjustable venturi section 12 has a flared exit 25 and a cylindrical upstream section 26. Although not essential, the inside diameter 27 of adjustable venturi section 12 is preferably slightly (about 4%) larger than throat diameter 24. Venturi section 12 is axially positioned and threaded to housing section 11 by means of threads 28 with cylindrical upstream section 26 extending into mixing chamber 20. A series of parallel longitudinal serrations 29 extend around the periphery of venturi section 12 at approximately its midsection. The serrations 29 are engageable by stud 30 of locking plug 13. A notch 31 is shown on a diameter of flared exit 25 which, though nonessential, may be used to conveniently rotate section 12 in threads 28 for insertion and removal of venturi section 12 when housing section 11 is not fitted at thread 14b with a fluid conduit.

O-ring 32 provides a fluid-tight seal between housing section 11 and venturi section 12.

Venturi section 12 is axially adjustable in housing 11 to thereby vary the position of cylindrical upstream section 26 in mixing chamber 20. Axial adjustment is accomplished by removing locking plug 13 and rotating venturi section 12 in threads 28 by engaging successive serrations 29 with an appropriate tool such as a screwdriver. Venturi section 12 is thus axially adjustable from a position in which cylindrical upstream section 26 engages throat 22 (to thereby isolate mixing chamber 20) to the downstream limit of threads 28 wherein cylindrical upstream section 26 lies within threads 28 of housing section 11 and no longer extends into mixing chamber 20.

After venturi section 12 has been positioned as desired, plug 13 is inserted and stud 30 engages a serration 29 (see FIG. 2) to thereby lock venturi section 12 in place. Stud 30 is not essential at low pressures since threads 28 are sufficient to secure venturi section 12. As pressure in the line increases, however, it becomes desirable to provide stud 30 with locking plug 13 to engage serrations 29 and thereby positively secure venturi section 12 against rotation. In the absence of such a means to secure venturi section 12, high pressure tends to vary the position of venturi section 12 by rotating the section in threads 28.

The embodiment shown in FIGS. 1–3 is capable of accommodating two injection lines since two injection apertures 19a and 19b are provided. The number of injector apertures may vary, however, and with the hexagonal peripheral section 18 shown, for example, six such apertures may be conveniently provided. Thus the invention can accommodate a series of injection lines or merely one. In the event that injection apertures are provided but not used they may be plugged without undesirably affecting the injection in the lines used.

The relative size of nominal diameter 15, mixing chamber diameter 21, throat diameter 24, and adjustable venturi section inside diameter 27 is critical. Mixing chamber diameter 21 must be larger than throat diameter 24 and adjustable venturi section inside diameter 27 and both diameters 24 and 27 must be smaller than nominal diameter 15. In addition it is desirable, although not essential, that inside diameter 27 of adjustable venturi section 12 be slightly larger than throat diameter 24 as pointed out above. The outside diameter of cylindrical upstream section 26 must, of course, be smaller than nominal diameter 15 to insure that end section 29 may be withdrawn into the threaded portion 28 of housing section 11.

In operation housing section 11 is inserted into a fluid conduit by means of threads 14a and 14b with thread 14a upstream. Injector lines (not shown) are threaded into injector apertures 19a and 19b. As fluid flows in the direction of arrow A (see FIG. 1) fluid is drawn into mixing chamber 20 through injector apertures 19. The rate of injection may be varied by rotating venturi section 12 by means of serrations 29 as previously described to vary the position of cylindrical end section 26 in mixing chamber 20. Injection may be eliminated by adjusting venturi section 12 so that end section 26 is adjacent to throat 24 and mixing chamber 20 is thereby isolated from the fluid flowing in the direction of arrow A. If desired a gasket may be provided to insure an efficient seal between end section 26 and throat 24 when they are in contact.

The design of FIG. 4 incorporates the essential elements of the invention yet is somewhat different from the design of FIG. 1. With reference to FIG. 4 housing 33 contains threads 34a (upstream) and 34b (downstream). Housing 33 together with boss 35 defines injector aperture 36. Set screws 37a and 37b are provided as shown. Two adjustable venturi sections 38 and 39 are axially slidable in housing 33. Venturi section 38 is flared from nominal diameter 40 to throat diameter 41. Venturi section 39 is flared from nominal diameter 40 to inside diameter 42 and a cylindrical end section 43 is provided by decreasing the thickness of venturi section 39 to thereby form a collar 44. Mixing chamber 45 is therefore provided without increasing the diameter of housing section 33. O-rings 46a and 46b are provided to insure a fluid seal between venturi sections 38 and 39, respectively, and housing section 33.

The rate of injection may be adjusted by axially varying the position of venturi section 39. Set screws 37a and 37b secure venturi sections 38 and 39 respectively after such adjustment. Since the design is for low pressure application, set screws 37a and 37b are sufficient and a lock means such as is provided by the embodiment of FIG. 1 is unnecessary. The design of FIG. 4 is especially adaptable for use with a garden hose, for example.

The foregoing invention therefore provides a venturi injector which can accommodate more than one injection line. The rate of injection may be varied by axially adjusting the position of the upstream end of a venturi section in a mixing chamber communicating with the injector lines. The invention provides an efficient and economical venturi injector capable of developing a higher rate of injection than the injectors of the prior art.

What I claim and desire to secure by Letters Patent is:

1. A variable venturi injector comprising a housing having a nominal inside diameter and defining an injector aperture extending from the exterior to the interior thereof, a throat section defining an axially extending throat having an inside diameter less than said nominal inside diameter, an adjustable venturi section axially positioned in said housing and axially movable therein, said venturi section having an inside diameter less than said nominal inside diameter and a cylindrical end section, said end section extending toward said throat and defining a mixing chamber with said housing at said injector aperture, and means for axially moving said venturi section to bring the end of the cylindrical end section into contact with the throat section completely about the end of the throat defined thereby, whereby said mixing chamber is no longer defined.

2. The injector of claim 1 and removable means for securing said adjustable venturi section with respect to said housing to thereby prevent axial movement thereof.

3. A variable venturi injector comprising a housing having a nominal inside diameter and defining an injector aperture extending from the exterior to the interior thereof; said housing having an upstream and downstream end; a throat section defining an axially extending throat having an inside diameter less than said nominal diameter and a flared end section extending from said throat divergently toward said upstream end; an adjustable venturi section axially positioned in said housing and axially movable therein; said venturi section having an inside diameter less than said nominal diameter but at least as great as said throat diameter, a flared exit section extending from said venturi section inside diameter divergently toward said downstream end, and a cylindrical end section extending toward said upstream end, said cylindrical end section defining a mixing chamber with said housing at said injector aperture, and means for axially moving said venturi section to bring the end of the cylindrical end sections into contact with the throat section completely about the end of the throat defined thereby, whereby said mixing chamber is no longer defined.

4. The injector of claim 3 and removable means for securing said adjustable venturi section with respect to said housing to thereby prevent axial movement thereof.

5. A variable venturi injector comprising a housing having a nominal inside diameter and defining an injector aperture extending from the exterior to the interior thereof, a throat section defining an axially extending throat having an inside diameter less than said nominal inside diameter, an adjustable venturi section axially positioned in said housing and axially movable therein, said venturi section having an inside diameter less than said nominal inside diameter and a cylindrical end section, said end section extending toward said throat and defining a mixing chamber with said housing at said injector aperture, said adjustable venturi section being threadably engaged with said housing and defining a series of peripherally spaced serrations, said housing section defining a radially extending aperture extending from the exterior thereof to the interior thereof adjacent said serrations, and means within said aperture for engaging said serrations to thereby prevent rotation of said venturi section.

6. A variable venturi injector comprising a housing having a nominal inside diameter and defining an injector aperture extending from the exterior to the interior thereof; said housing having an upstream and downstream end; a throat section defining an axially extending throat having an inside diameter less than said nominal diameter and a flared end section extending from said throat divergently toward said upstream end; an adjustable venturi section axially positioned in said housing and axially movable therein; said venturi section having an inside diameter less than said nominal diameter but at least as great as said throat diameter, a flared exit section extending from said venturi section inside diameter divergently toward said downstream end, and a cylindrical end section extending toward said upstream end, said cylindrical end section defining a mixing chamber with said housing at said injector aperture, said adjustable venturi section being threadably engaged with said housing and defining a series of peripherally spaced serrations, said housing section defining a radially extending aperture extending from the exterior thereof to the interior thereof adjacent said serrations, and means within said aperture for engaging said serrations to thereby prevent rotation of said venturi section.

References Cited

UNITED STATES PATENTS

| | | | |
|---|---|---|---|
| 1,835,603 | 12/1931 | Kincaid | 103—262 |
| 1,986,489 | 1/1935 | Wahlbom et al. | 103—262 |
| 2,938,464 | 5/1960 | Nielsen | 103—262 |
| 1,549,375 | 8/1925 | Nordquist | 103—264 |
| 2,080,623 | 5/1937 | McMahon | 103—262 |
| 3,217,657 | 11/1965 | Borgerud | 103—262 |

FOREIGN PATENTS 161,290   2/1955   Australia.

HENRY F. RADUAZO, *Primary Examiner.*